(12) United States Patent (10) Patent No.: US 7,917,444 B1
Bursch (45) Date of Patent: Mar. 29, 2011

(54) SECURE SINGLE-USE TRANSACTION NUMBERS

(75) Inventor: Todd Bursch, Minneapolis, MN (US)

(73) Assignee: McAfee, Inc., Santa Clara, CA (US)

( * ) Notice: Subject to any disclaimer, the term of this patent is extended or adjusted under 35 U.S.C. 154(b) by 2508 days.

(21) Appl. No.: 10/282,641

(22) Filed: Oct. 29, 2002

(51) Int. Cl.
*G06Q 40/00* (2006.01)

(52) U.S. Cl. ............... 705/64; 726/26; 726/13; 705/75; 705/76

(58) Field of Classification Search ............ 705/75, 705/44, 35, 76, 64, 40; 713/168; 380/248; 726/26, 13
See application file for complete search history.

(56) References Cited

U.S. PATENT DOCUMENTS

| | | | |
|---|---|---|---|
| 4,924,514 A | 5/1990 | Matyas et al. | |
| 5,727,163 A | 3/1998 | Bezos | 395/227 |
| 5,799,084 A * | 8/1998 | Gallagher et al. | 380/248 |
| 5,815,665 A | 9/1998 | Teper et al. | 395/200.59 |
| 5,883,810 A | 3/1999 | Franklin et al. | 364/479.02 |
| 5,974,148 A * | 10/1999 | Stambler | 705/75 |
| 6,070,154 A | 5/2000 | Tavor et al. | 705/55 |
| 6,163,771 A | 12/2000 | Walker et al. | |
| 6,647,376 B1 | 11/2003 | Farrar et al. | |
| 2001/0047335 A1* | 11/2001 | Arndt et al. | 705/44 |
| 2002/0013900 A1* | 1/2002 | Ibuki | 713/168 |
| 2002/0026397 A1* | 2/2002 | Ieta et al. | 705/35 |
| 2009/0134217 A1 | 5/2009 | Flitcroft et al. | |

OTHER PUBLICATIONS

Joel Snyder, Safeguard your network, Feb. 1995, Macworld, v12n2, pp. 122-127.*
Russell Kay, Authentication, Mar. 27, 2000; Computerworld, v34n13, p. 77.*
Stephen Swoyer, Vasco Data SecurityOs VACMan keeps unwanted user out, Mar. 24, 1999, ENT, p. 36(1).*
"American Express—Private Payments (sm)", http://www26.americanexpress.com/privatepayments/info_page.jsp, Copyright 2000, American Express Company,(2000), 2pgs.
"American Express—Private Payments(sm)—Frequently Asked Questions", http://www26.americanexpress.com/privatepayments/faq.isp, Copyright 2000, American Express Company,(2000), 9pgs.
"American Express—Private Payments(sm) Tutorial", http://www26.americanexpress.com/privatepayments/tutorial.jsp, Copyright 2000, American Express Company,(2000), 2 pgs.
"Installing and Using a SofToken-II Authenticator", *Copyright 2000, Secure Computing Corporation*, Part No. 86-0934000-B,(2000), 19 pgs.
"Secure Computing—SafeWord", http://www.safeword.com/sw44.htm, (2000), 5pgs.
"Secure Computing—SafeWord (R) SofToken Dynamic Password Generator", http://www.safeword.com/softoken.new.html, (2000), 3pgs.

(Continued)

*Primary Examiner* — Behrang Badii
(74) *Attorney, Agent, or Firm* — Schwegman, Lundberg & Woessner, P.A.

(57) ABSTRACT

Methods for producing and applications for single-use transaction numbers. The transaction numbers are single-use in that the numbers are only valid for a single transaction. The transaction numbers can be generated just prior to being used, minimizing the amount of time during which they can be lost or stolen. The transaction numbers can be generated using encryption technology such as dynamic password technology. The encryption technology makes it very difficult if not impossible to predict what the next transaction number generated will be. The transaction numbers are unique to the user and can be validated or authenticated by an issuing institution that maintains an ability to generate the same transaction numbers issued to the user.

21 Claims, 4 Drawing Sheets

OTHER PUBLICATIONS

"Secure Computing—SafeWord (tm) Demonstration Version—Authenticator Notice", *Copyright 2000, Secure Computing Corporation*, Part No. 86-0930814-F, 1pg.

"Secure Computing—Welcome to SafeWord", http://www.safeword.com, (2000), 2pgs.

"Secure Computing Authenticator Administration Guide—SafeWord (tm)—Version 5.1.1 (SafeWord) and 2.0 (SafeWord Plus)", *Copyright 2000, Secure Computing Corporation*, Part No. 86-0933994-B, 72 pgs.

"Secure Computing User Guide—SofToken-II Authenticator—Version 1.03", *Copyright 2000, Secure Computing Corporation*, Part No. 86-0934000-B,(Jun. 2000), 3 pgs.

"Secure Computing User's Guide—e.iD Authenticator for Palm (tm)—Version 2.0", *Copyright 2000, Secure Computing Corporation*, Part No. 86-0933323-C, 8 pgs.

U.S. Appl. No. 11/932,753, Final Office Action mailed Oct. 15, 2009, 11 pgs.

U.S. Appl. No. 11/932,753, Non-Final Office Action mailed Feb. 19, 2009, 12 pgs.

U.S. Appl. No. 11/932,753, Notice of Allowance mailed Feb. 19, 2010, 14 pgs.

U.S. Appl. No. 11/932,753, Advisory Action mailed Dec. 28, 2009, 3 pgs.

U.S. Appl. No. 11/932,753, Notice of Allowance mailed Jun. 10, 2010, 35 pgs.

U.S. Appl. No. 11/932,753, Response filed Jan. 15, 2010 to Advisory Action mailed Dec. 28, 2009, 15 pgs.

U.S. Appl. No. 11/932,753, Response filed Dec. 15, 2009 to Final Office Action mailed Oct. 15, 2009, 14 pgs.

U.S. Appl. No. 11/932,753, Response filed Dec. 19, 2008 to Restriction Requirement mailed Nov. 17, 2008, 9 pgs.

U.S. Appl. No. 11/932,753, Response filed Jun. 26, 2009 to Non Final Office Action mailed Feb. 19, 2009, 9 pgs.

U.S. Appl. No. 11/932,753, Restriction Requirement mailed Nov. 17, 2008, 6 pgs.

U.S. Appl. No. 11/932,794, Final Office Action mailed Aug. 12, 2010, 16 pgs.

U.S. Appl. No. 11/932,794, Non-Final Office Action mailed Feb. 2, 2010, 14 pgs.

U.S. Appl. No. 11/932,794, Response filed Jun. 2, 2010 to Non Final Office Action mailed Feb. 2, 2010, 12 pgs.

Lewis, P. H, et al., "Technology: How to keep bandits from 'Snarfing' your passwords", The New York Times, [online], Feb. 13, 1994 [retrieved on Feb. 14, 2010]. Retrieved from the Internet: <http://www.nytimes.com/1994/02/13/business/technology-how-to-keep-bandits-from-snarf...>.

U.S. Appl. No. 11/932,794, Response filed Nov. 12, 2010 to Final Office Action mailed Aug. 12, 2010, 14 pgs.

\* cited by examiner

SECURE SINGLE-USE TRANSACTION NUMBERS

FIELD OF THE INVENTION

The present invention relates to the generation of and uses for secure, single-use, transaction numbers. More specifically, the present invention utilizes authenticating numbers to generate secure, single-use, transaction numbers.

BACKGROUND OF THE INVENTION

Business account numbers are known in the art and are used extensively throughout the world's economy. They allow customers to make purchases without using cash by having the cost of the purchase billed to them through an account at a financial institution. Typically, the business account numbers are printed on a card carried by the customer and presented at the time of purchase to the merchant providing the goods or services. Examples of business account numbers include credit card numbers (such as issued by VISA, MasterCard), charge card numbers (such as issued by American Express), and phone card numbers (such as issued by MCI).

Typically, business account numbers comprise a routing number and an account number. The routing number identifies the institution or organization that is responsible for maintaining the account associated with the authorized user of the business account number. This routing institution is typically a financial institution, such as a bank. The account number lets the routing institution identify the account to which all transactions using a particular business account number are to be associated.

In a typical transaction involving a business account number, a customer wishing to enter into a transaction with a merchant presents the merchant with their business account number. Usually, the merchant will then provide the business account number to the routing institution identified by the routing number to see whether the business account number and the amount of the proposed transaction are valid. The routing institution then uses the account number to check whether the proposed transaction should be validated for the underlying account. The routing institution then informs the merchant as to whether or not the underlying transaction is validated.

Business account numbers have enjoyed great success. Unfortunately, business account number fraud has been around almost as long as business account numbers themselves. Too often the business account number is lost or stolen and then used by an unauthorized person to make purchases that get billed to the authorized user.

Expansion of the Internet and e-commerce have enabled many consumers to use their business account numbers to make online purchases. Although online commerce has experienced dramatic growth in recent years, concerns about online business account number fraud and privacy concerns have dampened even greater expansion of online purchases. Many consumers are concerned about online businesses and merchants collecting their personal information.

One attempt to solve these problems is the use of limited-life business account numbers available as Private Payments[SM] from American Express®. The business account number is a unique number that is linked to the consumer's actual account number. Consumers can use these limited-life business account numbers instead of actual card numbers to make purchases online. These numbers are limited-life because they can be used for a limited amount of time depending on the time of month the number is issued. Generally, they expire within a minimum of 30 days and a maximum of 67 days. These business account numbers are obtained by logging onto a particular website and entering a user id and a password. The obtained transaction number and expiration date is then used to make an online purchase by copying (by typing, dragging and dropping, or cutting and pasting, for example) the obtained number and expiration date into the appropriate fields on the merchant's website where the information is being requested.

Limited-life business account numbers are relatively new and may enjoy some success. However, each of these limited-life numbers can be utilized for multiple transactions and, if a number is obtained by an unauthorized user, the number can be used inappropriately for the period of time before the number expires. Accordingly, there still exists a long-felt need in the industry to improve the security surrounding the use of business account numbers.

SUMMARY OF THE INVENTION

The present invention addresses one or more of the problems identified above by providing for secure, single-use, transaction numbers. A transaction number generator is utilized to create transaction numbers one at a time. The sequence of transaction numbers generated is unique for each transaction number generator. Encryption technology can be used to make it difficult, if not impossible, to predict the next transaction number that will be generated. Transaction numbers according to the present invention are single-use in that once a specific transaction number is used in a transaction it will not be validated for any other transaction.

For each transaction number generator issued by an issuing institution to an authorized user, the issuing institute maintains a copy of the transaction number generator referred to as a transaction number validator. This transaction number validator is capable of generating the exact sequence unique to the transaction number generator. In this manner, the issuing institution can generate transaction numbers that are identical to the transaction numbers that the institution expects to receive from the authorized user of the transaction number generator. The issuing institution uses the transaction number validator to validate or invalidate transaction numbers as they are received in conjunction with intended transactions.

DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION OF THE INVENTION

Figure 1:
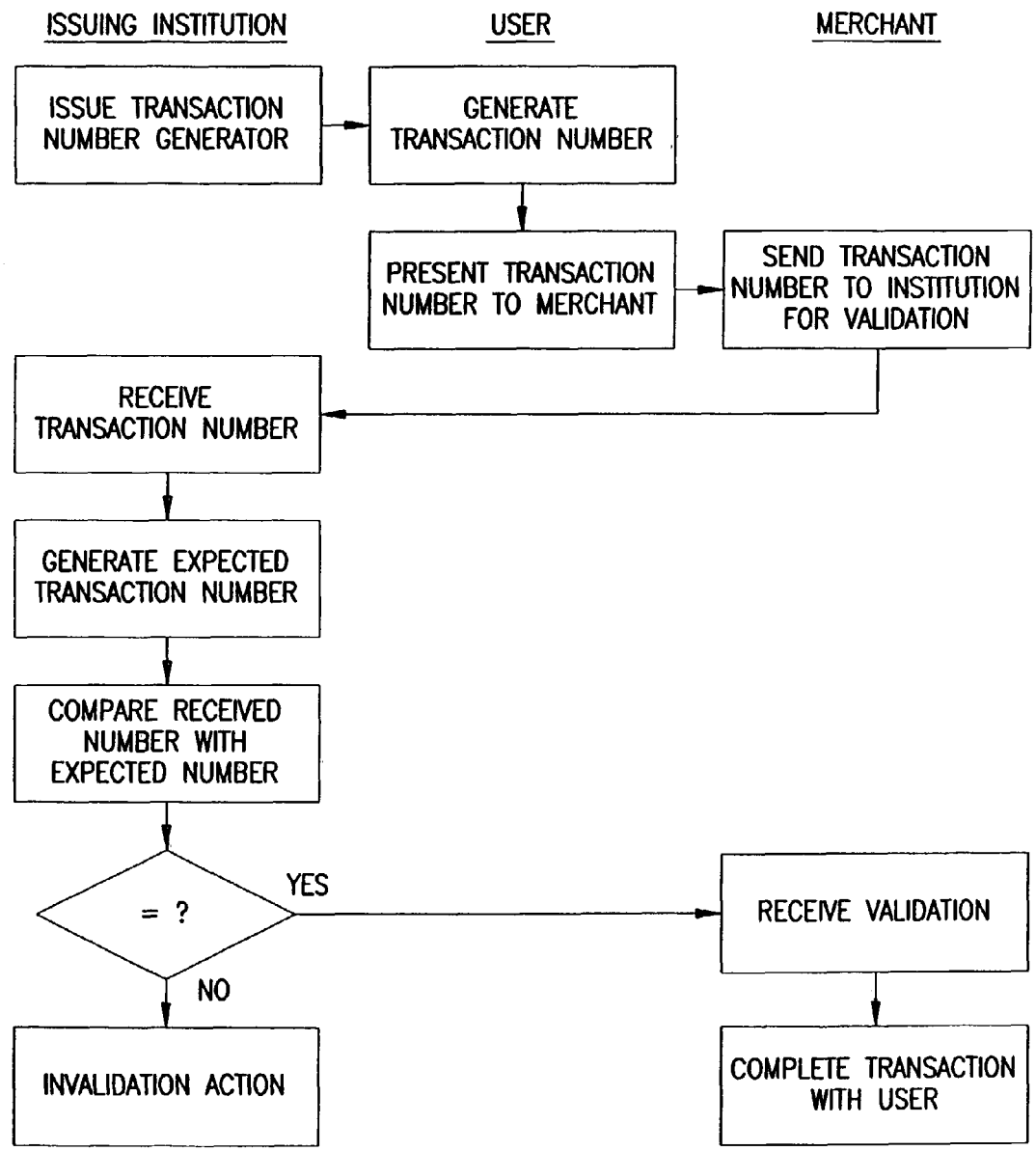
FIG. 1 illustrates an embodiment of the present invention in the form of a flowchart.

The present invention allows a consumer to generate a secure, single-use, transaction number that can be used to make purchases of goods and services. Transaction numbers according to the present invention have the same format as business account numbers of the prior art and can be used in the same manner as business account numbers. Merchants process transaction numbers in the same manner that they would process business account numbers. In fact because transaction numbers according to the present invention can have a format identical to business account numbers, merchants most likely will not be able to distinguish between the two types of numbers.

Transaction numbers may comprise any number of alphanumeric characters. For example, a transaction number may have the same format as a credit card number, which typically are comprised of 16 digits. Additionally, a transaction number may have a 15-digit format like many charge card numbers or a 10-digit format like many phone card numbers.

Transaction numbers contain a routing number, an account number, and an authenticating number. The authenticating number is discussed below. A routing number identifies the institution or organization that maintains the account associated with the transaction number, frequently a bank or other financial institution. This institution may or may not be the same institution that opened an account on behalf of a customer. For purposes of the present specification the institution identified by the routing number will be referred to as the issuing institution. By way of example, usually the first 4 digits of a credit card number comprise the routing number.

The account number is used by the issuing institution to uniquely identify the person or entity to which the transaction number is associated and to identify the account to which all transactions are debited or credited. For example, in a credit card number the account number is usually comprised of the 7 digits immediately following the 4-digit routing number. When a purchase is made using a transaction number, the issuing institution records purchase information (amount, date, and merchant identification, for example) on the account of the user indicated by the account number.

According to the present invention, an issuing institution issues a transaction number generator to its customers instead of a business account number. The transaction number generator is adapted to generate a unique sequence of transaction numbers. For example, a transaction number generator issued to a first user will generate a sequence of transaction numbers that is different than the sequence of transaction numbers generated by a transaction number generator issued to a second user. At each point in a sequence of transaction numbers, the user will not know what the next transaction number will be. The use of encryption technology to generate transaction numbers can make it very difficult, if not impossible, to predict at any point what the next generated transaction number will be.

The issuing financial institution maintains a copy of the transaction number generator. By maintaining a copy, it is meant that the issuing institution maintains the ability to generate the same unique sequence of transaction numbers that each user's transaction number generator is capable of generating. The issuing institution's copy of the issued transaction number generator can be referred to as a transaction number validator. The institution's transaction number validator can be implemented differently than the issued transaction number generator. For example, the issued transaction number generator could be a handheld device and the transaction number validator could be implemented in software running on a personal computer. The transaction number validator is used to validate or verify user transaction numbers as they are received by the institution in conjunction with a transaction, such as a purchase.

A transaction according to the present invention typically proceeds in the following manner. A user wishing to make a purchase uses his/her transaction generator to generate a transaction number. The user then provides the generated transaction number to the merchant providing the product or service to be purchased. The merchant may contact the issuing institution (identified by the routing number) to verify or validate the transaction number before allowing the proposed transaction to proceed. Of course, the merchant may take the risk of proceeding without first validating the transaction number. In either case, the merchant provides the transaction number to the issuing institution, either to validate the number before completing a transaction or after a completed transaction. The issuing institution uses the account number in the transaction number to identify the account associated with the received number, then uses the transaction number validator associated with that account to generate the next number in that user's unique sequence. Since the issuing institution is using a copy of the user's transaction number generator, this transaction number generated by the issuing institution should be identical to the transaction number generated by the user and provided to the issuing institution by the merchant. For purposes of the present specification, the number generated by the issuing institution will be referred to as the expected number because it is the next number that the issuing institution expects from that particular user. The issuing institution compares the two numbers. If the number received by the issuing institution is identical to the number that it expected to receive, then the issuing institution informs the merchant that the transaction number supplied by the user is valid. If the transaction numbers are not identical, then the issuing institution informs the merchant that the transaction number supplied is invalid and the transaction should not be allowed or should not have been allowed.

A flowchart depicting a particular embodiment of the present invention is shown in FIG. 1. First, an issuing institution issues a transaction number generator copy to a user associated with an account. Upon wishing to enter into a transaction, such as a purchase, the user generates a transaction number and presents the generated transaction number to a merchant. The merchant then sends the transaction number to the issuing institution for validation. The issuing institution receives the transaction number and generates an expected transaction number. The issuing institution then compares the two transaction numbers. If the two numbers are equal, the merchant receives a validation from the issuing institution and completes the proposed transaction. If the two transaction numbers are not equal the issuing institution initiates an invalidation action.

There are a variety of invalidation actions that can be initiated (in addition to notifying the merchant) when the expected transaction number does not match the transaction number received in conjunction with a transaction. One example is to have the user account shut down or invalidated. However, this may be a harsh result as the authorized user may have generated a transaction number and then discarded it after deciding not to use it. The unused number would be the next number expected by the issuing institution. If the user then generates another transaction number and attempts to use the new one, the issuing institution would invalidate it because the issuing institution is expecting to receive the discarded number. In this scenario, a legitimate user would have their account shut down simply because they did not use one of the transaction numbers in their sequence.

More likely, an authorized user will have made two (or more) purchases in a short period of time and the transaction number used for the second (or later) purchase will have arrived at the issuing institution before the transaction number used for the first purchase. That is, two or more legitimately used numbers may arrive at the issuing institution out of order. Since the issuing institution will be using a copy of the same transaction number generator as the authorized user, the issuing institution will expect to receive the transaction numbers in the order they were generated. Out of order transaction numbers will appear to be invalid.

To prevent invalidating legitimately used transaction numbers, an issuing institution could generate and maintain a list of expected transaction numbers for each authorized user. Whenever the issuing institution receives a transaction number corresponding to a proposed purchase, the institution compares the received transaction to each transaction number in the list of expected transaction numbers. If any of the transaction numbers in the list of expected transaction numbers matches the received transaction number, then the transaction is validated or allowed. If none of the expected numbers matches the received number, then the transaction is invalidated or not allowed. Each time a received transaction number is validated it can be removed from the list of expected numbers and replaced by the next transaction number generated. As long as the size of the list of expected transaction numbers is small relative to the number of different transaction numbers in each user's unique sequence of transaction numbers, the probability of an unauthorized person guessing a valid number remains very small.

It is within the scope of the present invention to use more sophisticated strategies in maintaining a list of expected transaction numbers. For example, when an issuing institution receives a transaction number out of the expected order, the list of expected transaction numbers will contain one or more expected transaction numbers that were generated earlier than the received transaction number. In this scenario, the issuing institution could put a time limit on the earlier-generated transaction numbers, removing them from the list of expected transaction numbers if they have not been validated in a transaction before the time limit expires. In this manner, if an authorized user generated a transaction number and then discarded it without using it to make a transaction, the discarded transaction number would eventually (that is, after the time limit expired) be removed from the list of expected transaction numbers.

Any list of expected transaction numbers can be implemented in any number of ways known to those with ordinary skill in the art. Typically, the list of expected transaction numbers would be maintained by the issuing institution in a database of authorized users. However, the list of expected transaction numbers could even be maintained on paper. Maintaining the list on paper might become necessary, for example, if access to an issuing institution's computer system was disrupted.

Transaction numbers according to the present invention are single-use. For each purchase a different number is generated and compared to the number generated by the issuing institution (that is, the expected number). If anybody, including the legitimate user of the generator, attempts to use the same number twice, it would be rejected on the second attempted use because the issuing institution would have generated a new expected number for the second attempted purchase.

The fact that transaction numbers according to the present invention are single-use is an important security feature of the present invention. A lost or stolen transaction number that has been used according to the present invention cannot be used again.

The present invention utilizes an authenticating number generator to produce transaction numbers. The authenticating number generator is any device or computer software program capable of producing a unique sequence of alphanumeric numbers. The authenticating number generator generates an authenticating number, which is then combined with the routing number and the account number to form the transaction number. For a particular transaction number generator, the routing number and account number will be identical for each transaction number generated. Thus, it is the authenticating number that is unique for each transaction number generated.

The routing number, account number, and authenticating number can be combined in many different ways. For example, they could appear sequentially in the transaction number with the first few digits comprising the routing number, the next few digits comprising the account number, and the remaining digits comprising the authenticating number. Alternatively, the digits of these numbers could be interleaved. For example, every fourth digit of a transaction number could correspond to a digit in the routing number. What is important, is that the routing number, account number, and authenticating number are combined in a manner enabling the routing number to be determined, allowing the transaction number to be sent to the issuing institution when a transaction number is presented to a merchant in association with a proposed transaction.

In one embodiment of the present invention, authenticating number generators utilize encryption technology to generate a unique sequence of authenticating numbers. Encryption technology useful for producing authenticating numbers according to the present invention can be that which is known in the art of encryption technology. For example, the encryption technology may be the same that is utilized in systems that are generally referred to as "dynamic password" systems. Dynamic password systems are generally used to authenticate a user attempting access to a computer or network system. Dynamic password systems require a user to provide a different password each time identity must be authenticated. In a dynamic password system, a user wishing to access a computer network or system uses a dynamic password generator to create an authenticated password. Dynamic password generators are sometimes referred to as "tokens," or "authenticators," or "super-smart cards." Dynamic password generators all use cryptoalgorithms (that is, encryption algorithms) to generate the required, changing passwords. Various encryption algorithms can be used, but the most popular is the well-known and well-tested Data Encryption Standard ("DES"), interpreted in accordance with ANSI specification X9.9. A dynamic password generator may require the user to enter a personal identification number ("PIN") in order to generate a password. Thus, in one embodiment of the present invention, dynamic passwords can be used as authenticating numbers in producing transaction numbers.

Dynamic password generators maintain a usage count, which is incremented with each use. The generated passwords are an encrypted representation of that usage count. The preferred encryption algorithm is the well-known, industry standard, DES. Each dynamic password generator is programmed with a unique cryptographic cipher to ensure that the generated passwords are different from the passwords displayed by every other generator. That is, each dynamic password generator is capable of generating a sequence of passwords that is unique to the cipher used.

Existing dynamic password technology can be used to implement the present invention in the following manner. A dynamic password generator can be used to generate a dynamic password that is a sequence of alphanumeric characters. Thus, used in this manner, the dynamic password generator is in effect an authenticating number generator. Typically, the dynamic password will be a number represented by a sequence of digits. However, there is no technological reason why the dynamic password can't contain other alphanumeric characters. Generally, whether transaction numbers (and thus, dynamic passwords) contain only digits or may contain other alphanumeric characters will be dictated by the issuing institution.

The use of encryption technology in the present invention provides another important safety feature. The encryption algorithms are used to generate a unique sequence of transaction numbers in a manner that makes it extremely difficult, if not impossible, for somebody to predict what the next number in the sequence will be. Because transaction numbers according to the present invention are difficult to predict before being generated and they can only be used once, a user has the ability to leave only a small window of time during which a transaction number could be lost or stolen by only generating transaction numbers immediately before they are intended to be used.

Transaction number generators can be implemented on a variety of hosts. For example, the generator may be implemented in application software that runs on a personal computer and displays transaction numbers when they are requested. For example, a dynamic password generator, such as SofToken (available from the Secure Computing Corporation) can be utilized as an authenticating number generator. The dynamic passwords generated are used as authenticating numbers and combined with the appropriate routing number and account number to produce a transaction number.

Figure 2:
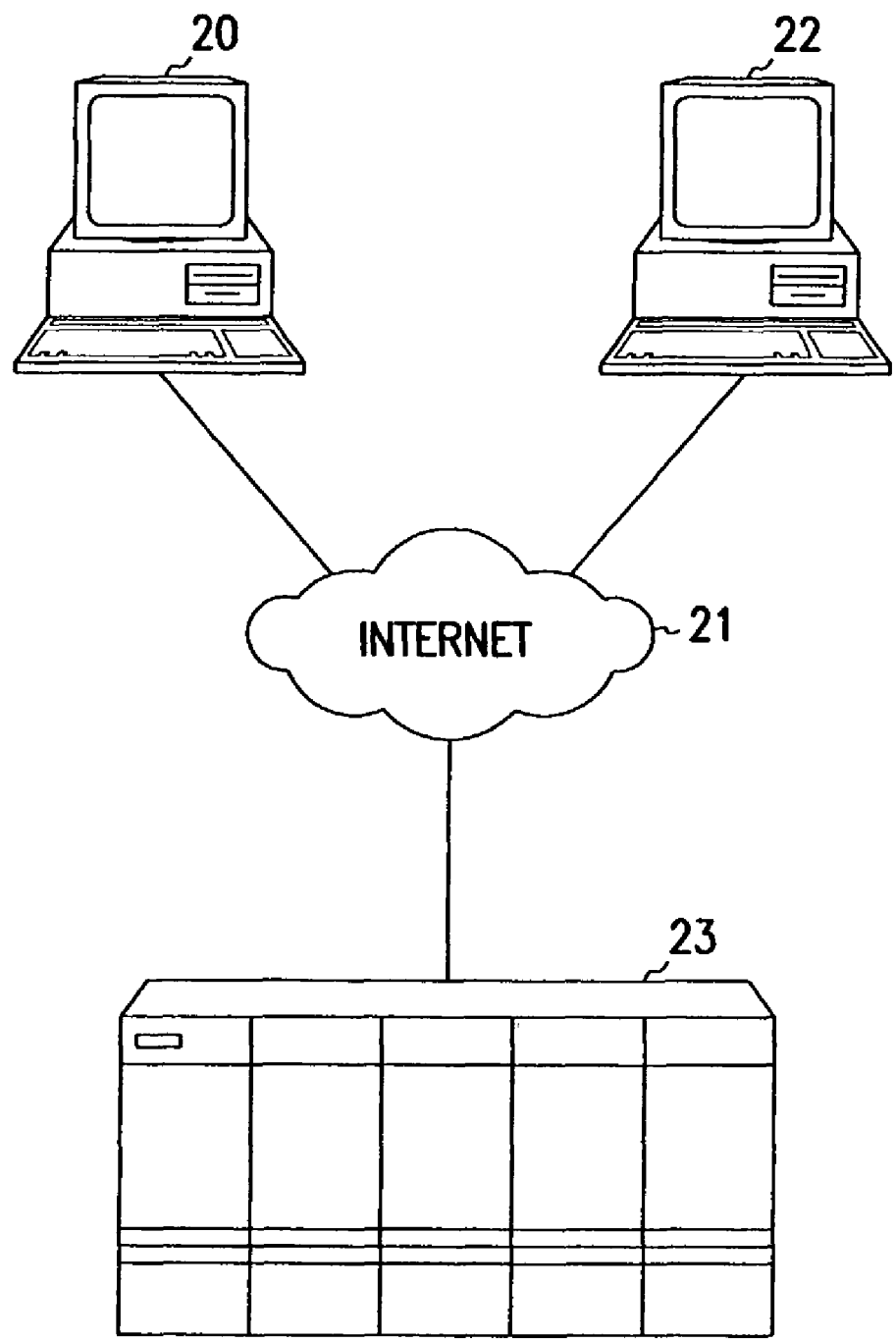
FIG. 2 illustrates an embodiment of the present invention as it might be used in conjunction with the Internet.

An example of an embodiment of the present invention implemented in application software that runs on a personal computer is shown in FIG. 2. In FIG. 2, a personal computer 20 embodying the present invention is connected to the Internet 21. A merchant 22 and the issuing institution 23 are also connected to the Internet. Upon interacting with a merchant 22 over the Internet 21, a user may wish to make a purchase of some product or service from the merchant 22 using a transaction number. The user utilizes the personal computer 20 to generate a transaction number. The transaction number is then sent to the merchant 22 over the Internet 21. The merchant 22 can then send the transaction number to the issuing institution 23 over the Internet. Alternatively, the merchant 22 could send the transaction number to the issuing institution 23 over a separate network, such as a payment network dedicated for this purpose. The issuing institution 23 validates (or invalidates) the transaction number. Validation of a transaction number is sent to the merchant 22 and the merchant 22 completes the transaction and notifies the user.

Alternately, transaction number generators may be implemented in handheld devices. The handheld device may be one that is dedicated as a transaction number generator or may be a device that has other uses (for example, a PDA or telephone).

In one embodiment, a transaction number generator is used to generate a single-use transaction number having the same format as a credit card number. That is, the single-use transaction number consists of 16 digits. Four of the 16 digits constitute a routing number and identifies the issuing institution and 7 of the digits constitutes an account number that identifies the user's account. The transaction number generator is implemented utilizing dynamic password technology capable of generating a 5 digit dynamic password. When a user requests a single-use transaction number, the generator first creates a 5 digit dynamic password consisting of 5 digits. This dynamic password is then combined with the 7 digit account number and the 4 digit routing number to produce a 16 digit, single-use, transaction number. The user can then use this transaction number just like a credit card number to make a purchase.

In a second embodiment of the present invention, the user is required to enter a PIN in order to generate a transaction number. This adds a level of security to the present invention. If a PIN is required, an unauthorized user would have to both gain access to the authorized user's transaction number generator and know the correct PIN before a transaction number could be generated.

What happens when an incorrect PIN is entered into a transaction number generator is not particularly critical to the present invention. In fact, an issuing institution could let the user decide what should be done. Choices of what might be done include shutting down the transaction number generator after a certain number of false PINs had been entered. This would prevent an unauthorized user from continuing to guess the correct PIN, but would required a user or issuing institution to reset the transaction number generator before it could be used again. This would be burdensome if a user temporarily forgot their PIN and entered enough incorrect PINs to shut the generator down. Another choice would be to have the transaction number generator slow down each time an incorrect PIN was entered, frustrating unauthorized users. A correct PIN entry could reset the transaction number generator to its original speed.

Figure 3A:
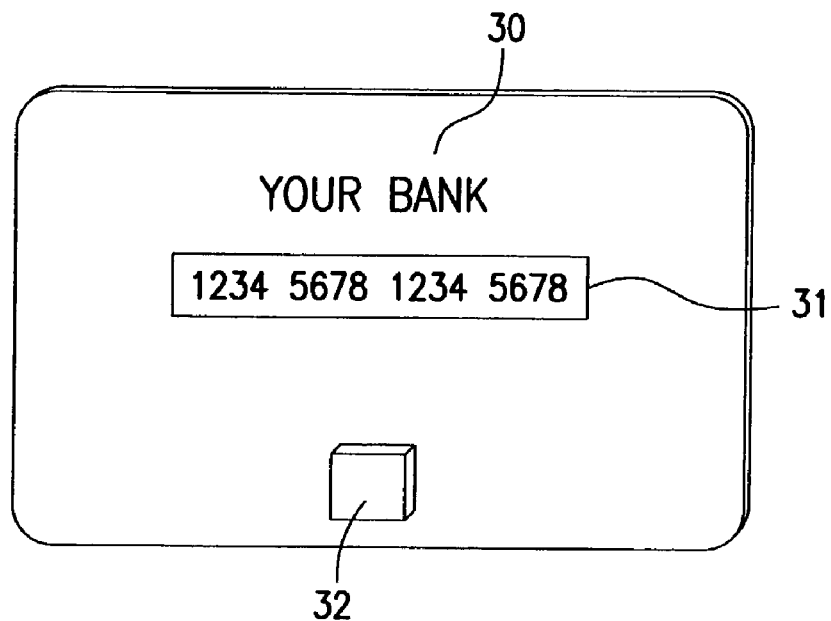
FIGS. 3A and 3B illustrate two handheld devices embodying the present invention.
Figure 3B:
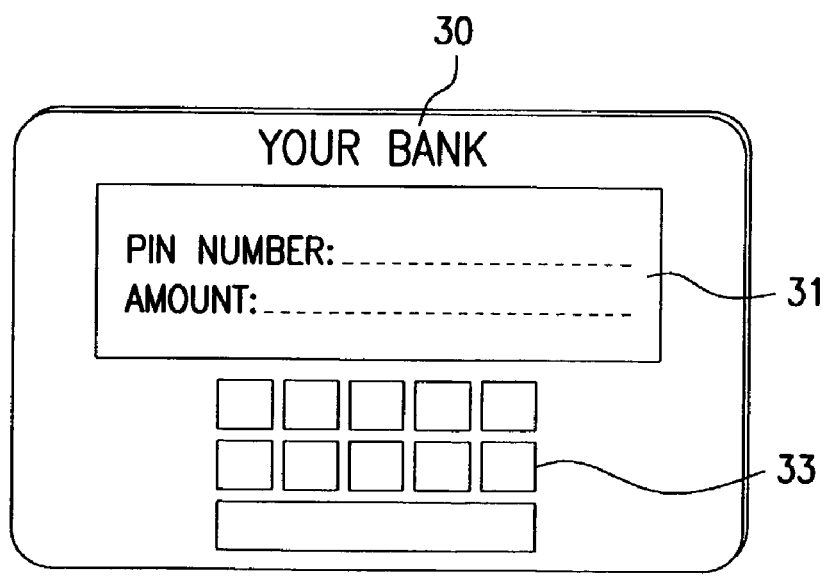

FIGS. 3A and 3B show examples of handheld devices embodying the present invention. The device shown in FIG. 3A does not require a user to enter a PIN or a transaction amount. Each time a user presses the button 32 a new transaction number is displayed in the display window 31. The name of the issuing institution 30 can be printed on the device for identification purposes. The device shown in FIG. 3B provides a keypad 33, allowing a user to enter a PIN as required by this embodiment. After the user enters a PIN, a transaction number is displayed in the display window 31.

Figure 4A:
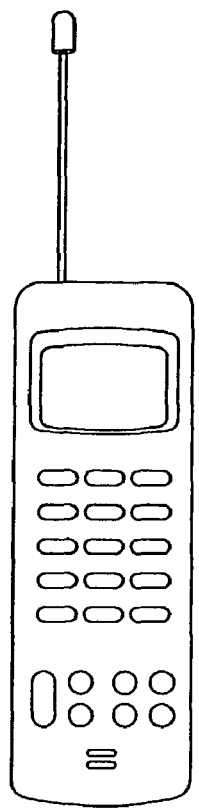
FIGS. 4A and 4B illustrate two additional handheld devices embodying the present invention.
Figure 4B:
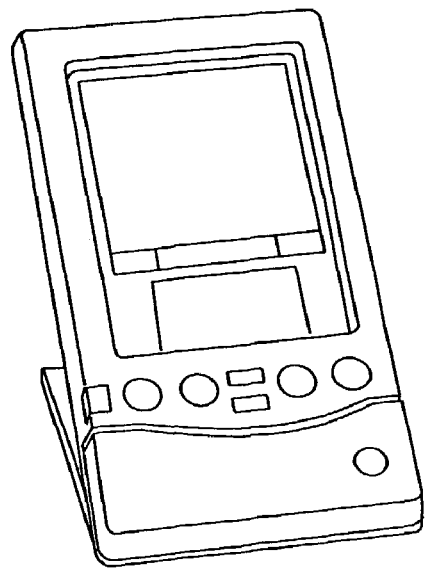

FIGS. 4A and 4B show additional embodiments of the present invention. FIG. 4A depicts a cell phone adapted to allow a user to generate transaction numbers according to the present invention. FIG. 4B depicts a personal digital assistant ("PDA") adapted to allow a user to generate transaction numbers according to the present invention.

It is intended to be within the scope of the present invention for a transaction number generator to output transaction numbers in a variety of forms. For example, the transaction number may be simply output as a number on a computer screen that can be read by a user. The user can then copy the transaction number in any manner that allows the user to transmit the transaction number to a merchant. Alternatively, a transaction number may be output via a wireless communication directly to a merchant. For example, the merchant may be a business that operates vending machines, parking meters, toll booths, etc., capable of receiving transaction numbers via a wireless communication. In this manner, a consumer could point their transaction number generator at a toll booth, for example, and press a button to pay the toll.

What is claimed is:

1. A method of generating a single-use transaction number, comprising:
   generating a one-time password, wherein generating the one-time password includes slowing down generation of the one-time password if an incorrect personal identification number (PIN) is entered; and
   combining the generated one-time password with a routing number and an account number to form a single-use transaction number;

wherein the single-use transaction number is formatted such that the routing number can be used to route the single-use transaction number and wherein combining includes interleaving bits of the routing number with bits of the one-time password.

2. The method according to claim 1, wherein the one-time password is generated using encryption technology.

3. The method according to claim 1, wherein the one-time password is at encrypted usage count.

4. The method according to claim 1, wherein the one-time password is generated using dynamic password technology.

5. The method according to claim 1, wherein the single-use transaction number comprises 16 digits.

6. The method according to claim 5, wherein the routing number comprises 4 digits.

7. The method according to claim 5, wherein the account number comprises 7 digits.

8. The method according to claim 5, wherein the one-time password comprises 5 digits.

9. The method according to claim 1, wherein combining includes displaying the single-use transaction number for use by the user.

10. The method according to claim 1, wherein generating the one-time password further includes generating a dynamic password as a function of a user activation.

11. The method according to claim 1, wherein generating the one-time password includes generating a dynamic password as a function of a factor selected from the group of factors including a personal identification number (PIN) and an amount.

12. A device for generating a single-use transaction number, comprising:
   means for generating a one-time password wherein the means for generating the one-time password includes slowing down generation of the one-time password if an incorrect personal identification number (PIN) is entered; and
   means for combining the generated one-time password with a routing number and an account number to form a single-use transaction number, and
   wherein the means for combining includes interleaving bits of the routing number with bits of the one-time password
   wherein the single-use transaction number is formatted such that the routing number can be used to route the single-use transaction number.

13. The device according to claim 12, wherein the means for generating the one-time password includes means for using encryption technology.

14. The device according to claim 12, wherein the one-time password is generated using an encrypted usage count.

15. The device according to claim 12, wherein the one-time password is generated using dynamic password technology.

16. The device according to claim 12, wherein the means for generating the one-time password includes means for generating a dynamic password as a function of a user activation.

17. The device according to claim 12, wherein the means for generating the one-time password includes means for generating a dynamic password as a function of a factor selected from the group of factors including a personal identification number (PIN) and an amount.

18. The device according to claim 17, wherein the means for generating the dynamic password includes means for receiving information from a user.

19. The device according to claim 12, wherein the means for combining includes means for presenting the single-use transaction number in a format similar to a credit card number.

20. The device according to claim 12, wherein the means for combining includes means for displaying the single-use transaction number for use by the user.

21. The device according to claim 12, wherein the means for combining includes means for transmitting the single-use transaction number to a wireless network.

* * * * *

UNITED STATES PATENT AND TRADEMARK OFFICE
CERTIFICATE OF CORRECTION

PATENT NO. : 7,917,444 B1  Page 1 of 1
APPLICATION NO. : 10/282641
DATED : March 29, 2011
INVENTOR(S) : Todd Bursch It is certified that error appears in the above-identified patent and that said Letters Patent is hereby corrected as shown below:

On the face page, in column 1, below field (22), insert
-- Related U.S. Application Data
(60) Provisional Patent Application Serial No. 60/345,482, filed October 29, 2001. --

On the face page, in field (56), under "Other Publications", in column 2, line 10, delete "faq.isp," and insert -- faq.jsp, --, therefor.

In column 1, line 3, below "Title", insert
-- CROSS-REFERENCE TO RELATED APPLICATIONS
The present application claims the priority benefit under 35 U.S.C. 119(e) of U.S. Provisional Patent Application Serial No. 60/345,482, filed October 29, 2001, and entitled "SECURE SINGLE-USE TRANSACTION NUMBERS," of which application is incorporated herein by reference in its entirety. --

Signed and Sealed this
Twenty-ninth Day of November, 2011

David J. Kappos
*Director of the United States Patent and Trademark Office*